(12) United States Patent
Gorham

(10) Patent No.: US 7,653,567 B2
(45) Date of Patent: Jan. 26, 2010

(54) INTEGRATED ONLINE JOB RECRUITMENT SYSTEM

(76) Inventor: Jason Stuart Gorham, 6132 Willoughby Cir., Lake Worth, FL (US) 33463

( * ) Notice: Subject to any disclaimer, the term of this patent is extended or adjusted under 35 U.S.C. 154(b) by 143 days.

(21) Appl. No.: 11/525,343

(22) Filed: Sep. 22, 2006

(65) Prior Publication Data

US 2007/0162323 A1    Jul. 12, 2007

Related U.S. Application Data

(60) Provisional application No. 60/596,450, filed on Sep. 23, 2005.

(51) Int. Cl.
*G06F 9/46* (2006.01)
(52) U.S. Cl. ........................................... 705/9
(58) Field of Classification Search ................. 705/9
See application file for complete search history.

(56) References Cited

U.S. PATENT DOCUMENTS 6,381,592 B1 *   4/2002   Reuning ..................... 707/3
6,662,194 B1 *  12/2003   Joao ........................ 707/104.1
7,099,872 B2     8/2006   Carpenter et al.

* cited by examiner

*Primary Examiner*—Romain Jeanty
(74) *Attorney, Agent, or Firm*—Howard M. Gitten; Edwards Angell Palmer & Dodge

(57) ABSTRACT

The present invention provides an easy to use system and method for assisting job seekers in locating job opportunities and applying for the same using an online connectivity protocol which is simple to use and highly efficient in terms of time consumption. The system identifies and extracts keywords from the job postings in an accessible job database to create a keyword targeted list that excludes common words and phrases. The keyword targeted list is then processed to form a keyword targeted prefix list which in turn is inserted into a search engine. Upon appropriate query by a potential job seeker, the search engine returns its results while giving prominent placement to one or more job postings sponsored by a recruiter. An interested job seeker clicks on the sponsored job posting is directed to the job details through a website mediated application programming interface.

31 Claims, 4 Drawing Sheets

INTEGRATED ONLINE JOB RECRUITMENT SYSTEM

CROSS-REFERENCE TO RELATED APPLICATIONS

This nonprovisional utility patent application claims priority from an earlier-filed U.S. provisional patent application, Ser. No. 60/596,450 entitled "Push Postings", filed by or on behalf of Jason S. Gorham on Sep. 23, 2005, the subject matter of which is hereby incorporated in its entirety by reference herein.

FIELD OF INVENTION

The invention generally relates to a job recruitment system and more specifically to a method and system for an online job recruitment system in which the various components function in an integrated manner.

BACKGROUND OF INVENTION

There is a large amount of activity in the general field of providing job recruitment service in context of finding employment opportunities and linking job seekers with employers in an easy to operate manner with an online connectivity which is less expensive and saves time. Several studies, research and invention(s) have delved into the subject (s) of matching online the employment opportunities and job seeker(s) by using internet connectivity.

At present there exist several ways in which a job seeker can locate an employment opportunity. Notable among these are looking at advertisements in the newspapers and other media, scanning corporate websites, viewing postings on various internet job sites and using the services of a recruiting firm.

The search for jobs by looking at advertisements in traditional media has become less popular since the advent of several other effective and quicker search channels. Advertisements in traditional or conventional media suffer from numerous deficiencies such as timely information about employment opportunity not being available, lesser coverage because of localized, regional or specialized circulation as a result of which several job seekers are not able to apply or are not aware of the opportunity at all. Moreover such advertisements are normally viewed by a very small segment of job seekers.

Employment opportunities posted on the corporate website of an organization are published immediately and can be viewed by a job seeker immediately thereafter, but suffer from the drawbacks that a job seeker must not only be aware of company's existence but also possess a reasonable degree of interest in the company to log on to or enter the corporate website of the organization to become aware of the employment opportunity. This method of job search also suffers from the deficiency of limiting the exposure of available job opportunities to actual or potential job seekers and is thus a detriment to both employers and job seekers.

The option of using internet job sites to locate job opportunities and to advertise existing job opportunities is a quicker and less time consuming method but such websites are currently often unable to provide a comprehensive detail of job position in a specific field of work. Search engines at such websites which are visited by the job seekers return a list of search results based on general assortment according to the keyword entered, and it is often not practical or feasible to scrutinize all the results presented by the site's search engine.

U.S. Patent Publication No. US 2001-0049674 describes a system and method for enabling an efficient employment recruiting protocol in which a job data collection is scrutinized by using multiple independent hierarchical category taxonomies.

U.S. Patent Publication No. US 2002-0026452 describes an internet based employee recruiting system and method for same in which a website contains links to a job database wherein the jobs are listed are according to a prescribed criteria and the potential candidates with matching qualifications and/or interests are required to take an online test. Successful candidates from the online test are then required to go through an offline assessment by a skilled specialist.

U.S. Pat. No. 6,370,510 discloses an employment recruitment system and method based on usage of a computer network for posting job openings along with the facility of automatic periodic searching.

U.S. Pat. No. 6,381,592 discloses a candidate chaser machine and a method for locating internet site pages which contain specified keywords.

The prior art has bulky designs and time consuming job search methods. Besides the prior art does not address to the issue of providing an employment recruiting protocol which is not only user friendly but also less time consuming and having extensive and ubiquitous coverage.

Accordingly there exists a need for providing an integrated online job recruitment system which directly links employers, recruiters and job seekers online and provides more specific job listings.

In view of the foregoing disadvantages, the general purpose of the present invention is to provide an improved combination of convenience and utility and to overcome the disadvantages and drawbacks of the prior art and to provide an online job recruitment system which is specific, quicker and more efficient.

SUMMARY OF INVENTION

The present invention provides an easy to use system and method for location of job opportunities and applying for same using an online connectivity protocol which is simple to use and highly efficient in terms of time consumption.

The system identifies and extracts keywords from the job postings in an accessible job database to create a keyword targeted list that excludes common words and phrases. The keyword targeted list is then processed to form a keyword targeted prefix list which in turn is inserted into a search engine. Upon appropriate query by a potential job seeker, the search engine returns its results while giving prominent placement to one or more job postings sponsored by a recruiter. An interested job seeker clicks on the sponsored job posting and optionally conditional upon remittance of the click-through or other charges, if any, for the same by the responsible party is directed to the job details through a website mediated application programming interface.

For a better understanding of the invention, its operating advantages and the specific objects attained by its user, reference is made to the accompanying drawings and associated description which illustrate exemplary embodiments of the present invention.

BRIEF DESCRIPTION OF DRAWINGS

For a better understanding of the nature of the present invention, reference should be made in the detailed description taken in conjunction with the accompanying drawings in which.

DETAILED DESCRIPTION OF THE INVENTION

The exemplary embodiments described herein are subject to numerous variations. It is understood that various omissions, substitutions or equivalents are contemplated as circumstances may suggest or render expedient, but is intended to cover the application or implementation without departing from the spirit or scope of the invention.

Figure 1:
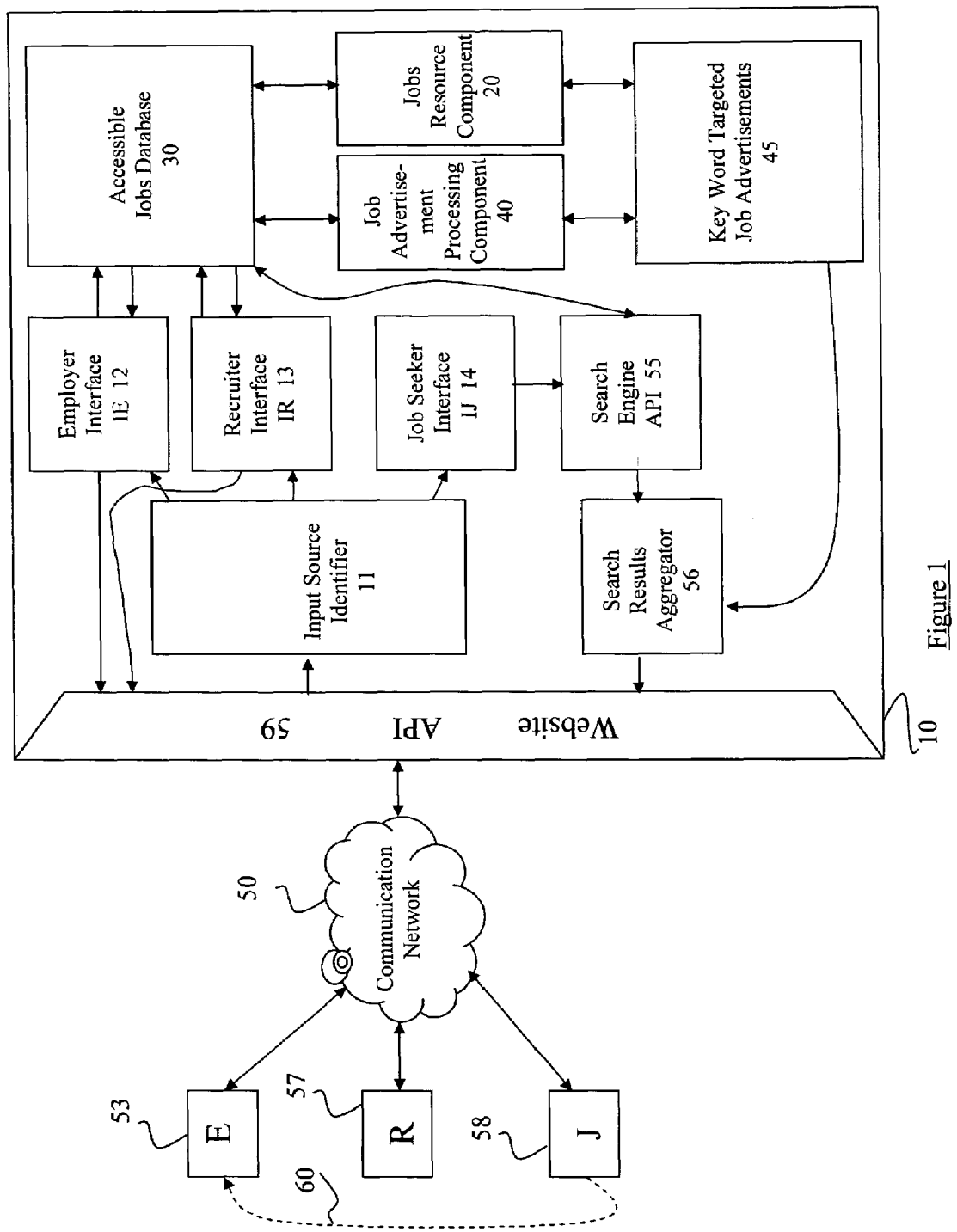
FIG. 1 provides an overview of the components and processes of the integrated online job recruitment system.

FIG. 1 provides an overview of the system 10 of the present invention and shows the inter-relationship of the processes involved in working of the invention. System 10 comprises a job resource component 20 linked to a job database 30 that is accessible from the internet through a communication network 50. As detailed elsewhere in this application, employers enter job listings into the database. The job advertisement posting data obtained from the accessible job database 30 is subjected to job advertisement processing performed by a job advertisement processing component 40.

The communication network 50 provides internet-based connectivity to the computers of employers, recruiters and job seekers for the efficient and smooth working of the invention. FIG. 1 also shows an exemplary employer's computer 53 (denoted by an 'E'), an exemplary recruiter's computer 57 (denoted by a 'R') and an exemplary job seeker's computer 58 (denoted by a 'J').

The system and method of the present invention also includes optional means to differentiate between employers, recruiters and/or job seekers in permitting access to the database 30. In one embodiment of the present invention, an input source identifier 11 categorizes each database access session as coming from an employer, a recruiter or a job seeker, and routes database access queries during that session to either an employer database interface 12, a recruiter database interface 13 or a job seeker database interface 14 as appropriate.

The system and method of the present invention also includes a search engine mediated application programming interface 55 and a website mediated application programming interface 59. The search engine mediated application programming interface 55 permits recruiters to insert job advertisements into the search engine as well as to modify them from time to time. A search results aggregator 56 combines the simple results of a database query by a search engine with targeted advertisements that are given prominent placement in the search results.

The website mediated application programming interface 59 allows job seekers to be directed to the appropriate employers and ensures submission of a job application once a job seeker clicks on a sponsored job posting advertisement inserted by a recruiter. The response of a job seeker to an employer as routed through the system and method of the present invention is herein designated as the job seeker's response 60.

Figure 2:
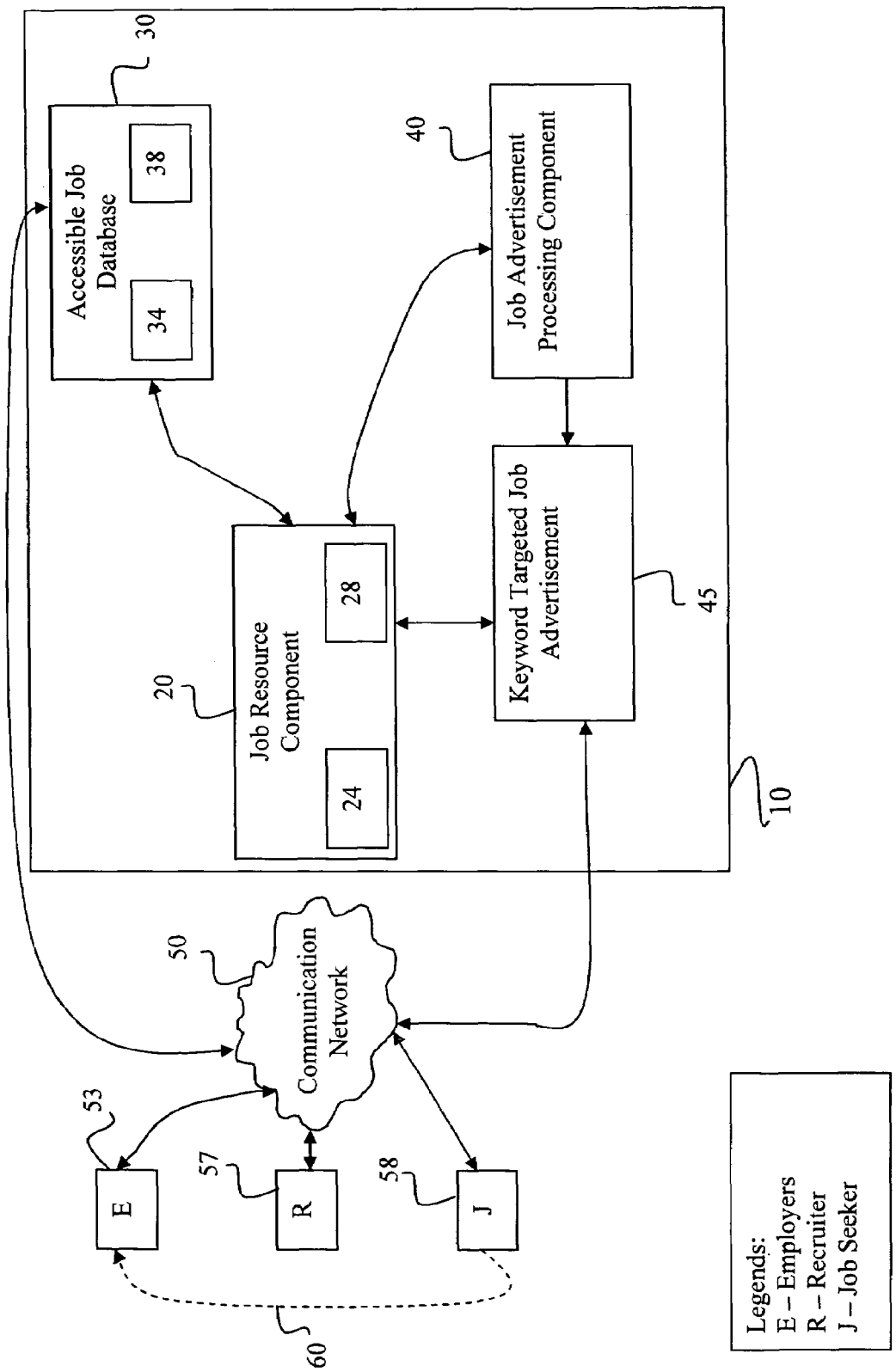
FIG. 2 illustrates the integration of the various components of the present invention in an exemplary embodiment.

FIG. 2 is a detailed description of the integration between the various components of the invention. The various components of the system 10 function in an integrated manner. The job resource component 20 further comprises a job keyword extractor 24 and means for creating a keyword targeted list 28. In alternative embodiments of the present invention, the accessible job database 30 could either be a direct entry database 34 or a password-mediated database 38 depending on whether the access to the site is free or restricted/paid.

Figure 3:
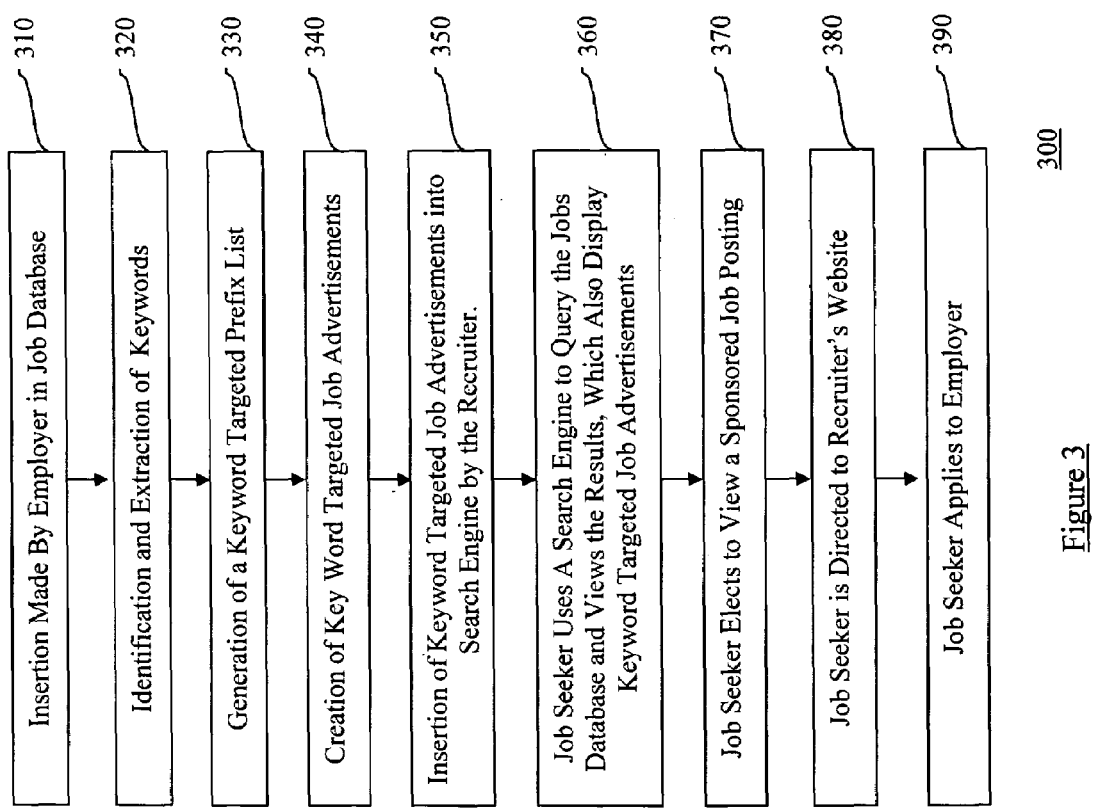
FIG. 3 is a flow chart depicting the preferred mode in an exemplary embodiment of the present invention.

FIG. 3 is a flow chart 300 depicting the working of the invention in the preferred embodiment. The process starts at 310 with an employer 53 accessing the accessible job database 30 via the communication network 50 and inserting job postings into the database. Next, the job keyword extractor 24 of the job resource component 20 identifies and extracts keywords and creates a keyword targeted list 28 as shown at 320. The keyword targeted list 28 is processed by the job advertising processing component 40 to generate a keyword targeted prefix list as shown at 330.

The integrated operation of the job resource component 20 and the job advertisement processing component 40 results in the creation of a keyword targeted job advertisement 45 as shown at 340. This advertisement 45 is inserted into a search engine at 350 through the search engine mediated application programming interface 55 and the associated search results aggregator 56 when a recruiter commissions the prominent placement of a sponsored job listing. A job seeker 58 who searches online for keywords that pertain to either job or industry related information is provided the search results along with a prominent display of sponsored job listings as shown at 360.

When the job seeker elects to click on one or more of the sponsored job listings as shown at 370, he or she is led to the commissioning recruiter's website through the website mediated application programming interface 59 as shown at 380, optionally conditioned upon remittance of the click-through or other charges, if any, for the same by the responsible party. The website API provides details of the job and the potential employer's contact information. The job seeker then applies to the employer for the posted job as shown at 390 by means of the job response 60.

Figure 4:
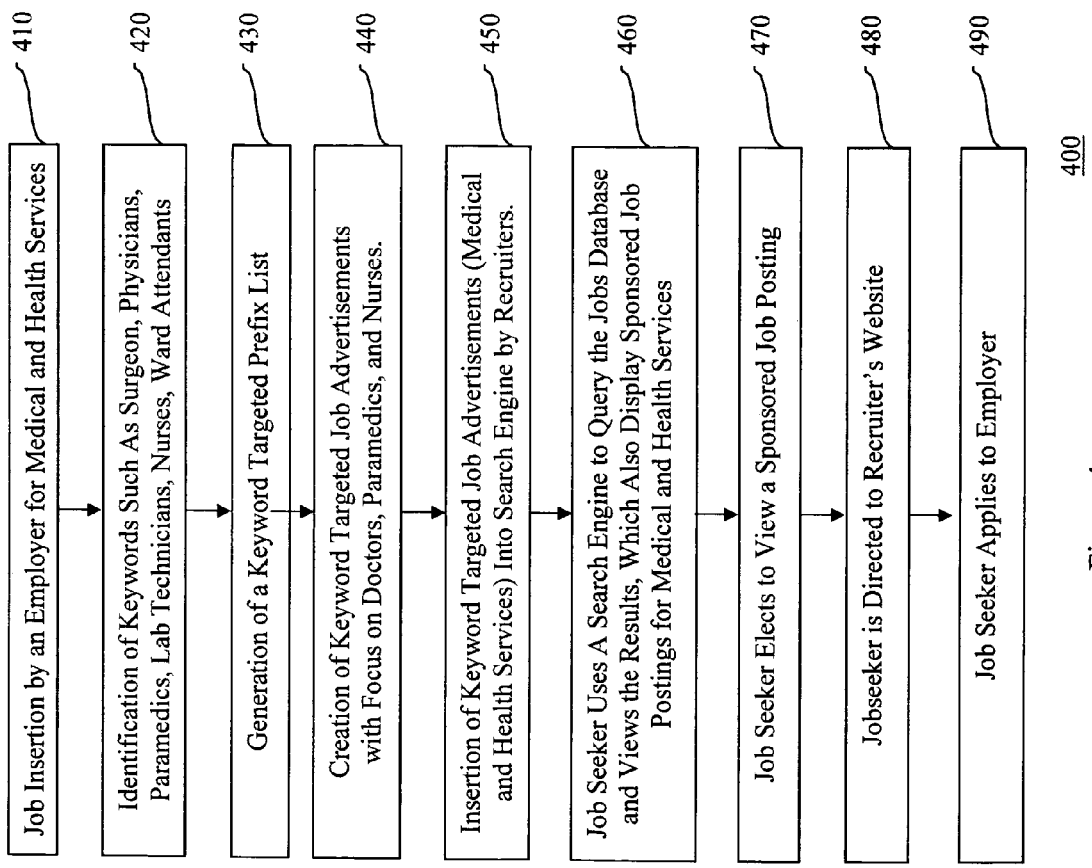
FIG. 4 is a flow chart depicting the working mode according to an exemplary embodiment.

FIG. 4 is a flow chart depicting the working mode of an exemplary embodiment of the present invention. The flow chart 400 illustrates the working mode of invention for job seekers in the field of medical and health services for positions such as doctors (physicians, surgeons, dentists, neurologists, nephrologists, etc.), paramedics (laboratory technicians, EMT operators, x-ray technicians, etc.), nurses and ward attendants.

The process starts at 410 with an employer 53 accessing the accessible job database 30 and inserting job postings into the database. Next, the job keyword extractor 24 of the job resource component 20 identifies and extracts keywords such as surgeon, physician, paramedic, Laboratory technician, nurse or ward attendant and creates a keyword targeted list 28 as shown at 420. The keyword targeted list 28 is processed by the job advertising processing component 40 to generate a keyword targeted prefix list as shown at 430.

440 shows the creation of a keyword targeted job advertisement 45. Such an advertisement 45 (for Medical and Health Services) is inserted into a search engine at 450 through the search engine mediated application programming interface 55 and the associated search results aggregator 56 when a recruiter commissions the prominent placement of a sponsored job listing. A job seeker 58 who searches online for job openings is provided the search results along with a prominent display of sponsored job listings for medical and health services as shown at 460.

When the job seeker elects to click on one or more of the sponsored job listings for medical and health services as shown at 470, he or she is led to the commissioning recruiter's website through the website mediated application programming interface 59 as shown at 480. The website API provides details of the job and the potential employer's contact information. The job seeker then applies to the employer for the posted job in the field of medical and health services as shown at 490 by means of the job response 60.

Although, a particular exemplary embodiment of the invention has been disclosed in detail for illustrative purposes, it will be obvious to those skilled in the art that numerous variations or modifications of the disclosed invention are possible, including the rearrangement in the configurations of job profiles, preferences of job seekers and requirements of the employers.

Accordingly, the invention is intended to embrace all such alterations, modifications and variations as may fall within the spirit and scope of the present invention.

What is claimed is:

1. An online job advertising system to render recruitment service, comprising:
    an accessible job database (or storing one or more keyword targeted lists;
    a job resource component comprising a processor, having a job keyword extractor for extracting keywords from one or more lob postings stored in a database other than the accessible lob database, and means for creating the keyword targeted list from an extracted keyword and storing the keyword targeted list in the accessible job database; and
    a job advertisement processing component comprising a processor for combining said keyword targeted list with a set of words to form a keyword targeted prefix list, said keyword targeted prefix list being processed by said job advertisement processing component to form a keyword targeted job advertisement for access from across a communication network.

2. A system as claimed in claim 1, wherein said job keyword extractor exercises a selective keyword extraction from said accessible job database.

3. A system as claimed in claim 2, wherein said selective keyword extraction results in extraction of all words from an advertised job posting except for those falling within a list of common words, with said list of common words including, without limitation, words and phrases like "a", "the", "required", "candidate".

4. A system as claimed in claim 1, wherein said means for creating a keyword target list is manual.

5. A system as claimed in claim 1, said means for creating a keyword target list is a computer.

6. A system as claimed in claim 1, wherein said accessible job database is a direct-entry type database with free or unrestricted access.

7. A system as claimed in claim 1, wherein said accessible job database is a password mediated type database with paid or restricted access.

8. A system as claimed in claim 1, further comprising a search engine mediated application programming interface making the accessible job database accessible across a communication and said search engine mediated application programming interface is provided by a search engine.

9. A system as claimed in claim 8, wherein said search engine is 'Google', 'Yahoo', 'Teems', 'Ajtavista' or any other search engine on the world wide web.

10. A system as claimed in claim 8, wherein said search engine mediated application programming interface permits the insertion of said keyword targeted prefix list into said search engine.

11. A system as claimed in claim 8, wherein said search engine mediated application programming interface permits the insertion of said keyword targeted job advertisements into said search engine.

12. The integrated online job recruitment system of claim 1 further comprising: a plurality of computers, each linked to the communication network for at least one of posting said job posting and viewing a keyword targeted job advertisement; and means for linking a job seeker with an employer as a function of the keyword targeted job advertisement.

13. A system as claimed in claim 12, wherein said plurality of computers have Internet connectivity.

14. A system as claimed in claim 13, wherein said plurality of computers includes computers belonging to one or more employers, recruiters and job seekers.

15. A system as claimed in claim 12, wherein said means for linking said employers and said job seekers is provided through a website mediated application processing interface at a website.

16. A system as claimed in claim 12, wherein said website is careermetasearch.com or other licensed or authorized website.

17. A method for providing an integrated online job recruitment service across a distributed network having an accessible job database, said method comprising of steps of:
    utilizing a processor to identify and extract keywords from job postings contained in the accessible job database;
    utilizing the processor to create keyword targeted job advertisements from the extracted keywords;
    utilizing the processor to insert said keyword targeted job advertisements into a search engine in a form of a sponsored job posting advertisement; and
    linking a job seeker across said distributed network with a matching employer as a function of the sponsored job posting advertisement.

18. A method as claimed in claim 17, wherein said step of identifying and extracting keywords consists of excluding a list of common words and phrases from said job postings.

19. A method as claimed in claim 17, wherein said step of creating keyword targeted job advertisements, consists of aligning said keywords according to importance and relativity, with said alignment resulting in creation of said sponsored job posting advertisement.

20. A method as claimed in claim 17, wherein said step of inserting a sponsored job posting advertisement is carded out by a search engine mediated application programming interface.

21. A method as claimed in claim 20, wherein said search engine mediated application programming interface permits the automatic insertion of said sponsored job posting advertisements into said search engine.

22. A method as claimed in claim 21, wherein said search engine is 'Google', 'Yahoo', 'Teoma', 'Altavista' or any other search engine on the world wide web.

23. A method as claimed in claim 17, wherein said step of linking a job seeker to matching employer is carried about by a website mediated application programming interface.

24. A method as claimed in claim 23, wherein said website is careermetasearch.com.

25. A method as claimed in claim 23, wherein said job seeker is a professional.

26. A method as claimed in claim 23, wherein said job seeker is a generalist.

27. A method as claimed in claim 23, wherein said job seeks is a worker.

28. A method as claimed in claim 23, wherein said employer is an institute.

29. A method as claimed in claim 23, wherein said employer is an incorporated company.

30. A method as claimed in claim 23, wherein said employer is an industrial unit.

31. A method as claimed in claim 23, wherein said employer is a governmental organization.

* * * * *